US012676442B2

(12) United States Patent
Buettemeyer et al.

(10) Patent No.: US 12,676,442 B2
(45) Date of Patent: Jul. 7, 2026

(54) ELECTROMAGNETIC SHIELDING FOR A PRINTED CIRCUIT BOARD CONNECTOR

(71) Applicant: HARTING ELECTRIC STIFTUNG & CO. KG, Espelkamp (DE)

(72) Inventors: Jana Buettemeyer, Rahden (DE); Gert Havermann, Wallenhorst (DE); Marc Genau, Luebbecke (DE); Arno Westpfahl, Espelkamp (DE); Dieter Rose, Rahden (DE)

(73) Assignee: HARTING ELECTRIC STIFTUNG & CO. KG, Espelkamp (DE)

( * ) Notice: Subject to any disclaimer, the term of this patent is extended or adjusted under 35 U.S.C. 154(b) by 374 days.

(21) Appl. No.: 18/274,973

(22) PCT Filed: Feb. 11, 2022

(86) PCT No.: PCT/DE2022/100116

§ 371 (c)(1),
(2) Date: Jul. 28, 2023

(87) PCT Pub. No.: WO2022/184206

PCT Pub. Date: Sep. 9, 2022

(65) Prior Publication Data

US 2024/0146001 A1 May 2, 2024

(30) Foreign Application Priority Data

Mar. 1, 2021 (DE) ..................... 10 2021 104 835.4

(51) Int. Cl.
*H01R 13/6582* (2011.01)
*H01R 12/71* (2011.01)
(Continued)

(52) U.S. Cl.
CPC ....... *H01R 13/6582* (2013.01); *H01R 12/716* (2013.01); *H01R 13/6594* (2013.01);
(Continued)

(58) Field of Classification Search
CPC .............. H01R 13/6582; H01R 12/716; H01R 13/6594; H01R 12/71; H01R 12/712;
(Continued)

(56) References Cited

U.S. PATENT DOCUMENTS 5,500,788 A 3/1996 Longueville et al. ........ 361/800
6,749,463 B1 6/2004 Fan ............................... 439/607
(Continued)

FOREIGN PATENT DOCUMENTS

DE 9311782 11/1993 ........... H01R 13/658
DE 102018109036 10/2018 ............. H01R 13/46
JP 2012252785 12/2012 ............. H01R 12/71

OTHER PUBLICATIONS

Search Report issued in German Patent Appln. Serial No. 10 2021 104 835.4, dated Oct. 29, 2021, with machine English translation 10 pages.

(Continued)

*Primary Examiner* — Justin M Kratt
(74) *Attorney, Agent, or Firm* — HAYES SOLOWAY P.C.

(57) ABSTRACT

Disclosed is a shielding of an electrically conductive material for use in a printed circuit board connector. The shielding is formed of at least two shield elements which each have at least two shield contact receptacles, at least two shield contact elements and at least one fastening structure for connection to a housing of the printed circuit board connector, and at least one printed circuit board contact for establishing an electrical connection to the printed circuit board to be contacted. The shield elements each have at least a first side element and a second side element which are interconnected by at least one intersection region.

11 Claims, 3 Drawing Sheets

(51) Int. Cl.
*H01R 13/6594* (2011.01)
*H01R 12/73* (2011.01)
*H01R 13/648* (2006.01)
*H01R 13/658* (2011.01)
*H01R 13/6581* (2011.01)
*H01R 13/6591* (2011.01)

(52) U.S. Cl.
CPC ............ *H01R 12/71* (2013.01); *H01R 12/712* (2013.01); *H01R 12/73* (2013.01); *H01R 13/648* (2013.01); *H01R 13/658* (2013.01); *H01R 13/6581* (2013.01); *H01R 13/6591* (2013.01)

(58) Field of Classification Search
CPC .... H01R 12/73; H01R 13/648; H01R 13/658; H01R 13/6581; H01R 13/6591
See application file for complete search history.

(56) References Cited

U.S. PATENT DOCUMENTS

| | | | | |
|---|---|---|---|---|
| 8,109,790 | B2 | 2/2012 | He et al. | 439/607.35 |
| 2005/0032400 | A1 | 2/2005 | Zhang et al. | 439/74 |
| 2006/0063432 | A1 * | 3/2006 | Chen | H01R 13/658 439/607.36 |

OTHER PUBLICATIONS

International Search Report and Written Opinion issued in PCT/DE2022/100116, dated May 17, 2022, with English translation, 21 pages.

International Preliminary Report on Patentability issued in PCT/DE2022/100116, dated Sep. 14, 2023, 9 pages.

* cited by examiner

ELECTROMAGNETIC SHIELDING FOR A PRINTED CIRCUIT BOARD CONNECTOR

The invention proceeds from an electromagnetic shielding for printed circuit board connectors according to the preamble of independent claim 1. Furthermore, the invention proceeds from a printed circuit board connector comprising an electromagnetic shielding.

Such shieldings are needed to protect/increase data integrity during transmission from a printed circuit board, also known as a circuit board or PCB, to a conductor and/or another printed circuit board connected to the printed circuit board. A shield element can significantly increase electromagnetic compatibility (EMC), which can also stabilize and/or increase the data transmission rate. For a particularly positive effect, a circumferential, so-called 360° shielding is sought.

PRIOR ART

In the current prior art, a printed circuit board connector with shield elements above and below the contact elements/rows of contact elements is often selected as a workaround, wherein the external contact elements of the printed circuit board connector are connected to a protective conductor (PE) or ground connection in order to simulate a circumferential shielding.

Logically, the outer contact elements are no longer available for their actual purpose. Particularly in view of advancing digitization and the associated increased demand for data transmission with the simultaneous desire for minimization, this approach is not sensible, let alone expedient.

DE 93 11 782 U1 shows that the contact pins of a connector mounted on a printed circuit board are shielded on all sides by a sheet metal frame which surrounds the contact pins. Solder pins on the sheet metal frame are electrically connected to conductor tracks of the printed circuit board. Spring-loaded contact tongues pointing into the interior of the sheet metal frame are welded to the sheet metal frame for contacting the shielding of a mating connector.

A disadvantage of this proposed shielding is, in particular, the need for at least two, complementary sheet metal frames.

The German Patent and Trade Mark Office has searched the following prior art in the priority application for the present application: DE 10 2018 109 036 A1.

STATEMENT OF PROBLEM

The object of the invention is to provide a more favorable and space-saving shielding for printed circuit board connectors compared to the prior art, which is moreover more universally applicable. A further object of the invention is to provide a printed circuit board connector equipped with an improved shielding.

Advantageous embodiments of the invention can be found in the dependent claims and the following description.

The shielding according to the invention consists of an electrically conductive material and is provided for use in a printed circuit board connector. In this case, the shielding is formed from at least two shield elements which each have at least two shield contact receptacles, at least two shield contact elements, and at least one fastening structure for connection to a housing of the printed circuit board connector, and at least one printed circuit board contact for establishing an electrically conductive connection to the printed circuit board to be contacted, wherein the shield elements each have at least one first side element and one second side element, which are interconnected by at least one intersection region. Printed circuit board connectors are connectors which contact a printed circuit board, also referred to as a PCB or circuit board, and, by connection to a mating connector, enable the transmission of electrical and/or electronic signals and/or power to at least one further printed circuit board or conductor, usually in the form of (shielded) cables. Shield elements are parts of the shielding which are designed as individual components and in combination form the unit of the shielding. The term "shield contact receptacle" is to be understood as a shaping of the shield elements which at least facilitates contacting of the shield contact elements, for example by a wedge-like guide contour. The shield contact elements are thus provided in particular for contacting with a shielding of a mating connector. The term "fastening structure" is to be understood to mean a recess and/or a shaping which enables the shield element to be fixed in a region of the housing provided for this purpose. The term "printed circuit board contact" means a region and/or a shaping of the shield element which can be connected to a printed circuit board, for example by soldering. The regions usually provided for this purpose on printed circuit boards are also referred to as solder pads and are usually embodied as contact points that can be connected with solder. A side element means partial regions of the shield element. According to the invention, a shield element is formed from at least two side elements which are connected by an intersection region. An intersection region is to be understood to mean a region in which the various planes in which the side elements run intersect. In the case of a straight printed circuit board connector, this angle is preferably between 85° and 95°. The shielding according to the invention enables particularly simple all-round shielding of the printed circuit board connector by means of shield elements of simple design.

In a particularly preferred embodiment of a shielding, the shield elements are of substantially identical design. This embodiment achieves a particularly cost-effective all-round shielding. This embodiment is very particularly advantageous for use with high-grade printed circuit board connectors. The shielding by substantially identical shield elements can be used very particularly advantageously in the field of hermaphroditic connectors.

Another embodiment proposes arranging the shield contact receptacle and the shield contact element alternately along at least one side of each shield element. This embodiment enables use in the field of hermaphroditic connectors. However, known male/female connectors can also be provided with identical shieldings. The identical design with alternating shield contact receptacles and shield contact elements thus creates a hermaphroditic shielding which simultaneously fulfills the function of all-round shielding.

In one embodiment, the first side element has at least one fastening structure and the second side element has at least one fastening structure. Depending on the design of the printed circuit board connector, it is thus ensured in each case that the intersection region is not overstressed by uneven loading during a plugging process and thus possibly damaged. In the case of printed circuit board connectors having a narrow side and a wide side, it may be particularly advantageous to design the side element associated with the wide side with two, three or more fastening structures. Shaping the fastening structure as a recess appears to be particularly advantageous. In this way, a printed circuit board connector can be provided with a particularly simple outer shell, the connection of which to an insulating body consists of simple webs. These fastening structures designed as recesses can be engaged with these webs in a simple manner.

An alternative embodiment has a shield contact receptacle with an inner side, wherein the inner side is distant from a plane in which the side element connected to the shield contact receptacle is located. This has a positive effect in particular on the contacting of the shield contact element with the side element, since the shield contact receptacle serves as a kind of ramp.

A further alternative embodiment has a shield contact element with an inner side, wherein the inner side moves away from a plane in which the side element connected to the shield contact element is located. This has a positive effect in particular on contacting with the side element of a shield element of a mating connector, since the shield contact element is brought increasingly close to said shield element during a plugging process.

A particularly advantageous embodiment is one in which the shield contact element and the shield contact receptacle move away from each other in different directions from a plane in which the side element connected to the shield contact element and the shield contact receptacle is located. The effects described above support each other when identical shielding is used in the printed circuit board connector and a mating connector is used.

In one embodiment, the shield contact element has a contact structure region at its end opposite the side element, which describes at least one curve structure. On the one hand, this curve structure can be designed for improved contacting. On the other hand, the curve structure in combination with a shield contact receptacle can also be shaped for an improved sliding movement during a plugging process.

A preferred, alternative embodiment provides that the contact structure region of the shield contact element substantially describes an S-shape. A shield contact element embodied in this way can combine the advantages mentioned above. The foremost region facilitates the sliding movement of the shield contact element over the shield contact receptacle of a mating connector, while the region adjacent thereto slopes in an arc towards a side part of a shield element to be contacted. In this way, particularly advantageous contacting can be achieved after an initially simplified plugging process.

The invention further proceeds from a printed circuit board connector comprising a housing, at least one contact receptacle for receiving at least one contact element, wherein the housing comprises at least two shield receptacles which are provided for receiving a shielding as above described. The printed circuit board connector is preferably a straight printed circuit board connector. Particularly advantageously, the printed circuit board connector is embodied as a hermaphroditic printed circuit board connector.

Furthermore, one embodiment recommends to embody the shield receptacles as point-symmetrical cavities in the housing, which are arranged between the outer wall of the housing and the at least one contact receptacle. This embodiment is particularly advantageous when identical shield elements of the shielding are used. Hermaphroditic connectors can be equipped in this way, very particularly advantageously.

EXEMPLARY EMBODIMENT

An exemplary embodiment of the invention is shown in the drawings and is explained in greater detail below, in which.

The figures contain partially simplified, schematic representations. In part, identical reference signs are used for like, but possibly not identical elements. Different views of like elements may be scaled differently. Directional indications such as "left", "right", "above" and "below" are to be understood with reference to the figure in question and may vary in the individual representations with respect to the object depicted.

Figure 1:
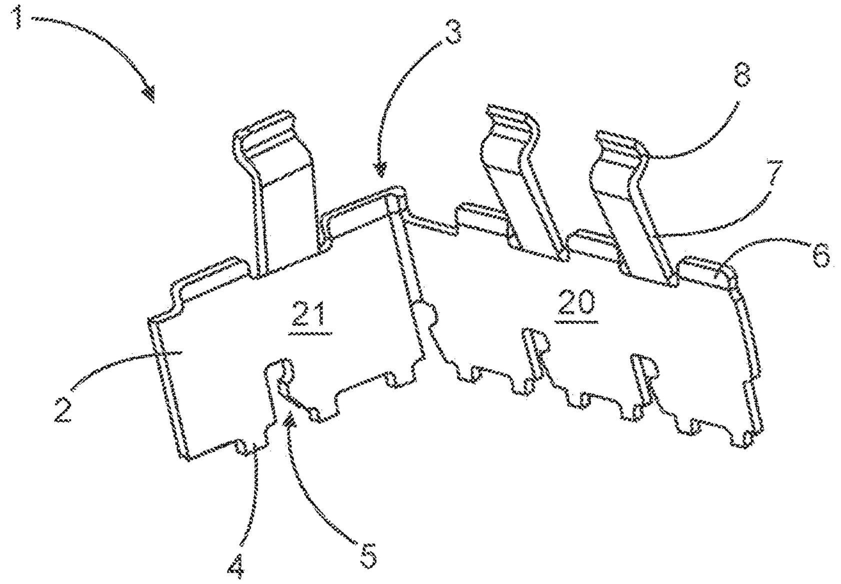
FIG. 1 shows a perspective view of a shield element.

FIG. 1 shows a single shield element 2 of the shielding 1 in a perspective view. Here, some particularly advantageous design features are apparent. First, the intersection region 3 is clearly visible between the substantially orthogonally oriented side elements, shown as first side element 20 and second side element 21. A printed circuit board contact 4, embodied as an extension, is visible in the lower region of the shield 15 element 2. This printed circuit board contact 4 is designed to be brought into electrically conductive connection with a soldering region of a printed circuit board to be connected thereto. At basically equal intervals along the first side element 20 and the second side element 21, fastening structures 5 are provided in the lower region, which are embodied as recesses. Furthermore, it can be seen that the fastening structures 5 are provided with a funnel-shaped entrance opening, as well as an undercut, into which a retaining pin or similar retaining element of the housing 11 can be inserted and fixed. In the upper region of the shield element 2, shield contact receptacle 6 and shield contact element 7 are arranged in alternating sequence. Here, the shield contact receptacles 6 are embodied with a slope at least on one side. The slope runs from a plane in which the respective side element, i.e. the first side element 20 or the second side element 21, is arranged, and moves away from this plane towards its upper end, away from a center point of a printed circuit board connector using the shield element 2. This slope of the shield contact receptacle 6 is achieved, for example, by a shaping process, such as a bending process. Alternatively, a cutting process, for example milling to introduce a chamfer, can also be achieved. The shield contact elements 7 are also arranged at an angle on the first side element 20 and the second side element 21. In the embodiment shown, the shield contact elements 7 leave the plane in which the respective side element lies, in an opposite direction to the exit side of the shield contact receptacles 6. It can further be seen that the shield contact elements 7 have a contact structure region 8 at the end which is arranged distally of the shield element 2. Depending on the perspective, the contact structure region 8 has substantially an S-shape. This design of the contact structure region 8 enables a simplified plugging of a printed circuit board connector with a shielding 1 according to the invention, wherein at the same time an improved contacting of the shield contact element 7 with the shield element 2 is achieved.

Figure 2:
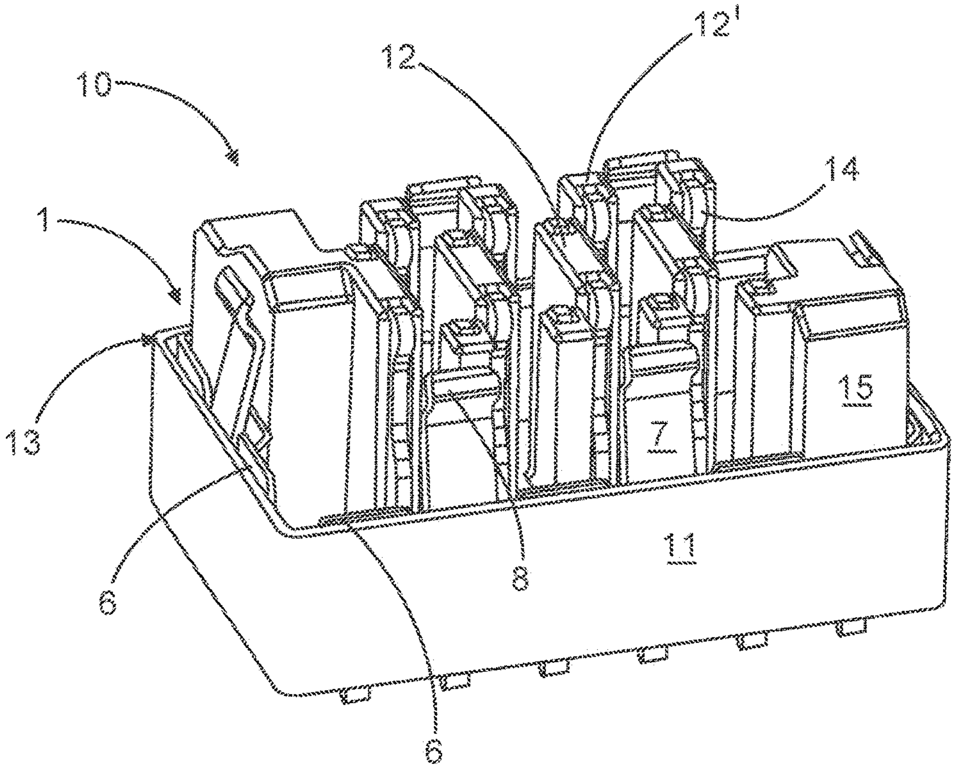
FIG. 2 shows a perspective view of a hermaphroditic printed circuit board connector with a shielding.

FIG. 2 shows an exemplary embodiment of a printed circuit board connector 10 according to the invention with shielding 1 according to the invention. The printed circuit board connector 10 is embodied here as a straight, hermaphroditic printed circuit board connector 10. Straight printed circuit board connectors are used in particular for connecting one printed circuit board to another printed circuit board in parallel arrangement to each other. An example of this is the arrangement of a so-called daughter board, also called a mezzanine board, on a main board, often called a motherboard. The housing 11 of the printed circuit board connector 10 has two cavities which function as shield receptacles 13. The shielding 1 is inserted into these shield receptacles 13. Only the printed circuit board contacts 4 protrude from the surrounding housing 11 at the lower region of the shielding 1. In the upper portion of the housing 11, the shield contact receptacles 6 at best do not protrude, or protrude at least only slightly, while the shield contact elements 7 at least substantially reach the height of the contact receptacles 12. The printed circuit board connector 10 is provided with different contact receptacles 12 and 12', wherein the contact receptacles 12 each receive two contact elements 14 and the contact receptacles 12' each receive one contact element 14. The contact elements 14 are also advantageously embodied as hermaphroditic contact elements.

Figure 3:
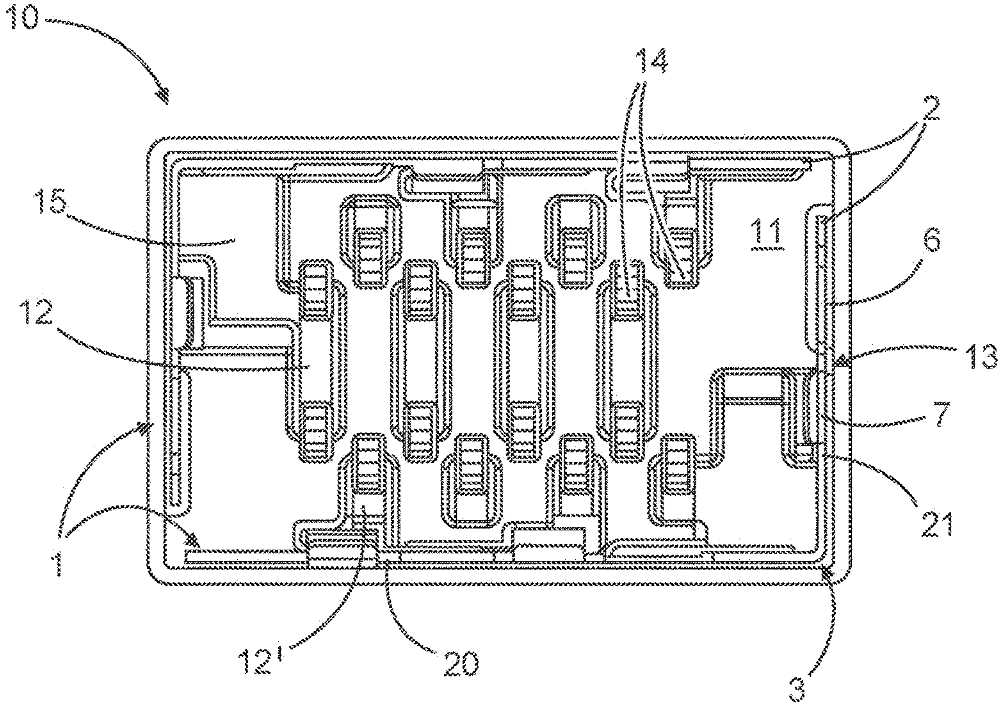
FIG. 3 shows a plan view of a mating face of a hermaphroditic printed circuit board connector with a shielding.

FIG. 3 shows a printed circuit board connector 10 as shown in FIG. 2, but in a view from above, more precisely looking at the plugging face. The shielding 1 is clearly recognizable as consisting of two hermaphroditically designed shield elements 2 of identical construction. The housing 11 of the printed circuit board connector 10 has two shield receptacles 13 which are formed as cavities receiving shield elements 2. In diagonally opposite corners of the housing 11, the housing 11 has one guide element 15 each. These guide elements 15 simplify a plugging operation with a mating connector, which in the example shown may be of identical construction. The shield contact receptacles 6 are made, for example, by a shaping process such as rolling, in such a way that a chamfer on their side facing the plugging face simplifies a plugging process. The shield contact elements 7 have an S-shaped contact structure region 8, which points with an uppermost curve in the direction of the plugging face of the printed circuit board connector 10.

Figure 4:
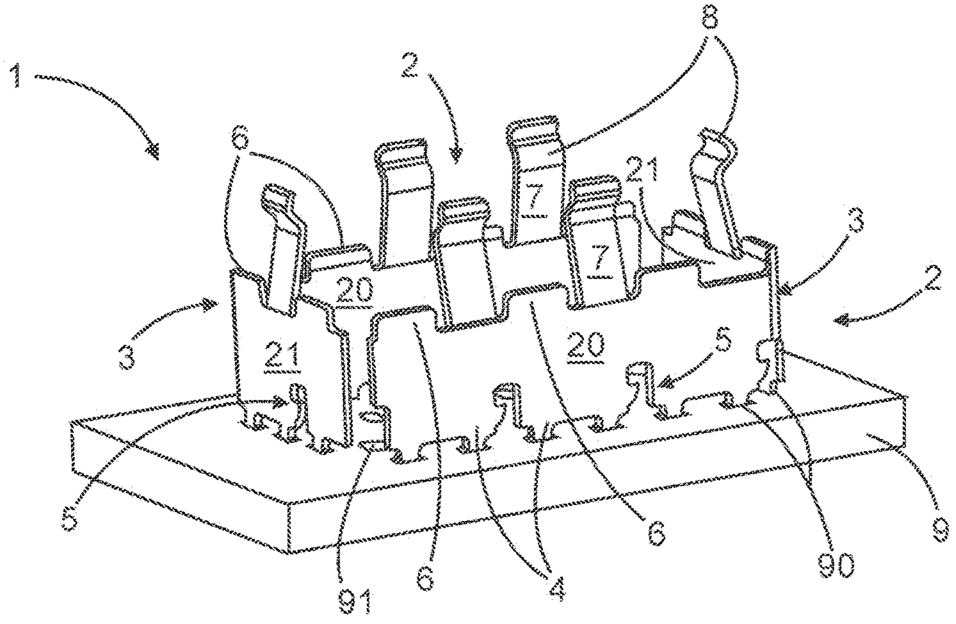
FIG. 4 shows a perspective view of a shielding without printed circuit board connectors on a printed circuit board.

FIG. 4 shows the use of a shielding 1 on a printed circuit board 9, wherein the surrounding printed circuit board connector 10 is omitted. The printed circuit board 9 has printed circuit board contact faces 90, which contact the printed circuit board contacts 4 arranged on the shielding 1. This contacting is usually fixed in an integrally bonded manner by a solder. The two identical shield elements 2 of the shielding 1 are L-shaped, wherein the intersection region 3 allows the first side element 20 and the second side element 21 to be delimited from one another.

Figure 5:
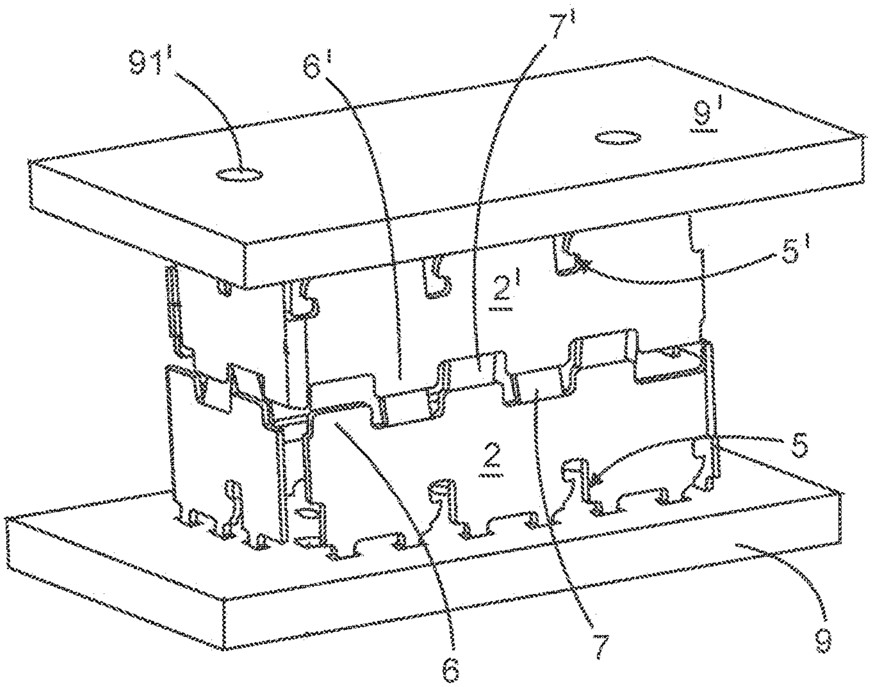
FIG. 5 shows a perspective view of two identical shieldings without printed circuit board connectors on one printed circuit board each.

FIG. 5 shows two printed circuit boards 9 and 9', each equipped with a shielding 1. The associated printed circuit board connectors 10 are omitted as in FIG. 5 for improved clarity. It is clearly shown here that the shield contact elements 7, 7' of the shielding 1 slide over the shield contact receptacles 6', 6 of the opposite shielding 1', 1 and contact the respective opposite shield elements 2', 2 at the first side face or the second side face. Likewise, the advantage of the embodiment of the shieldings 1 and 1' as hermaphroditic shielding is apparent. Four shield elements 2, 2' of identical design can easily and inexpensively achieve all-round shielding of two corresponding, straight printed circuit board connectors 10.

Even though various aspects or features of the invention are each shown in combination in the figures, it is apparent to a person skilled in the art—unless otherwise indicated—that the combinations shown and discussed are not the only possible ones. In particular, corresponding units or feature complexes from different exemplary embodiments may be interchanged with each other.

LIST OF REFERENCE SIGNS

1 shielding
2, 2' shield element
3 intersection region
4 printed circuit board contact
5 fastening structure
6, 6' shield contact receptacle
7, 7' shield contact element
8 contact structure region
9, 9' printed circuit board
10 printed circuit board connector
11 housing
12 contact receptacle
13 shield receptacle
14 contact element
15 guide element
20 first side element
21 second side element
90 printed circuit board contact face

The invention claimed is:

1. A shielding formed of an electrically conductive material for use in a printed circuit board connector, the shielding being formed of at least two L-shaped shield elements of substantially identical hermaphroditic design which each have at least two shield contact receptacles, at least two shield contact elements, and at least one fastening structure for connection to a housing of the printed circuit board connector, and at least one printed circuit board contact for establishing an electrically conductive connection to the printed circuit board to be contacted, wherein the L-shaped shield elements of substantially identical hermaphroditic design each have at least one first side element and one second side element which are interconnected by at least one intersection region.

2. The shielding as claimed in claim 1, wherein the shield contact receptacle and the shield contact element are arranged alternately along at least one side of each shield element.

3. The shielding as claimed in claim 1, wherein the first side element has at least one fastening structure and the second side element has at least one fastening structure.

4. The shielding as claimed in claim 1, wherein the shield contact receptacle has an inner side which is distant from a plane in which the side element connected to the shield contact element is located.

5. The shielding as claimed in claim 1, wherein the shield contact element has an inner side which is distant from a plane in which the side element connected to the shield contact element is located.

6. The shielding as claimed in claim 1, wherein the fastening structure is embodied as a recess.

7. The shielding as claimed in claim 1, wherein the shield contact element and the shield contact receptacle are configured to move away from each other in different directions from a plane in which the side element connected to the shield contact element and the shield contact receptacle is located.

8. The shielding as claimed in claim 1, wherein the shield contact element has, at its end opposite the side element, a contact structure region which describes at least one curve structure.

9. The shielding as claimed in claim 8, wherein the contact structure region substantially describes an S-shape.

10. A printed circuit board connector with a housing, and at least one contact receptacle for receiving at least one contact element, wherein the housing has at least two shield receptacles which are provided for receiving a shielding as claimed in claim 1.

11. A printed circuit board connector as claimed in claim 10, wherein the shield receptacles are embodied as point-symmetrical cavities in the housing, which are arranged between the outer wall of the housing and the at least one contact receptacle.

* * * * *